United States Patent [19]

Kitamura

[11] Patent Number: 5,042,309
[45] Date of Patent: Aug. 27, 1991

[54] APPARATUS AND METHOD FOR SENSING A THRUST LOAD APPLIED TO A SPINDLE OF A MACHINE TOOL

[75] Inventor: Koichiro Kitamura, Toyama, Japan

[73] Assignee: Kitamura Machinery Co., Ltd., Japan

[21] Appl. No.: 432,745

[22] PCT Filed: Mar. 1, 1989

[86] PCT No.: PCT/JP89/00210

§ 371 Date: Nov. 30, 1989

§ 102(e) Date: Nov. 30, 1989

[87] PCT Pub. No.: WO89/08005

PCT Pub. Date: Sep. 8, 1989

[30] Foreign Application Priority Data

Mar. 3, 1988 [JP] Japan .................................. 63-48682

[51] Int. Cl.⁵ .............................................. G01L 5/12
[52] U.S. Cl. .................................. 73/862.49; 73/104; 73/862.68; 408/11
[58] Field of Search ................ 73/104, 862.06, 862.49, 73/862.54, 862.68, DIG. 4; 340/680; 408/6, 8, 11, 16

[56] References Cited

U.S. PATENT DOCUMENTS

| | | | |
|---|---|---|---|
| 2,978,689 | 4/1961 | Tech et al. | 408/11 X |
| 3,208,311 | 9/1965 | Pierce | 408/11 |
| 3,872,285 | 3/1975 | Shum et al. | 73/104 X |
| 4,133,206 | 1/1979 | Hida et al. | 73/862.49 |
| 4,741,231 | 5/1988 | Patterson et al. | 73/862.06 X |

Primary Examiner—Charles A. Ruehl
Attorney, Agent, or Firm—Lorusso & Loud

[57] ABSTRACT

This invention relates to an apparatus and method for sensing a thrust load applied to a spindle of a machine tool. The object of the invention is to generate a signal representing the thrust load alone, exclusive of other forces such as frictional resistance within the spindle-head feeder, etc. so as to accurately measure the thrust load. According, to one disclosed embodiment, a first pressure sensor is arranged between a thrust bearing supporting the spindle and a surface on the spindle support and a second pressure sensor is arranged between a second surface on the spindle support and the machine tool frame. Each of the pressure sensors may be, for example, a piezo-electric film pressure sensor.

16 Claims, 4 Drawing Sheets

_5,042,309_

APPARATUS AND METHOD FOR SENSING A THRUST LOAD APPLIED TO A SPINDLE OF A MACHINE TOOL

TECHNICAL FIELD

This invention relates to apparatus and method for sensing a thrust load applied to a spindle of a machine tool.

BACKGROUND OF THE INVENTION

In conventional machine tools, sensing operations such as tool breakage sensing and tool wear sensing are performed by sensing the thrust load applied to a spindle of a machine tool. Thus cutting control of the machine tool may be adapted to the detected present conditions.

In the above-mentioned conventional methods for sensing the thrust load, the power of a spindlehead feed motor or the thrust load applied to a feed screw is taken as (substituted for) the thrust force applied to the spindle.

However, in case of sensing the power of the spindlehead feed motor or the thrust load applied to the feed screw, not only tool cutting resistance but also other frictional resistances such as frictional resistance against rotation within bearing support for a ball screw and sliding friction resistance applied to the spindlehead are also sensed at the same time. Accordingly, it is necessary to calculate a value representative of tool wear/breakage, e.g. by subtraction of frictional forces from the sensed power value. Thus, the sensing of tool wear/breakage tends to have low accuracy.

SUMMARY OF THE INVENTION

Accordingly, an object of the invention is to provide an apparatus and method for directly sensing the thrust load applied to a spindle of a machine tool, by which the thrust load alone can be sensed with a high degree of accuracy, to the exclusion of other forces such as tool cutting resistance and frictional resistances.

Accordingly, the machine tool of the present invention includes a frame, a spindlehead, a cylindrical spindle support mounted within the spindlehead and a spindle mounted on thrust bearings within the cylindrical spindle support. Pressure sensors are positioned between abutting surfaces normal to the axis of the spindle. For example, a pressure sensor may be positioned between flange on the spindle support and an annular seat surrounding the opening in the spindlehead which receives the spindle support, between an annular shoulder within a central bore of the spindle support and a surface on one of the bearings and/or between a flange ring bolted through a flange on the spindle support to the frame and the flange of the spindle support.

Upon application of a thrust load to the spindle support, each of the pressure sensors, preferably in the form of annular sensors coaxial with the spindle, will generate a signal representing the thrust load alone.

DESCRIPTION OF THE PREFERRED EMBODIMENTS

Figure 1:
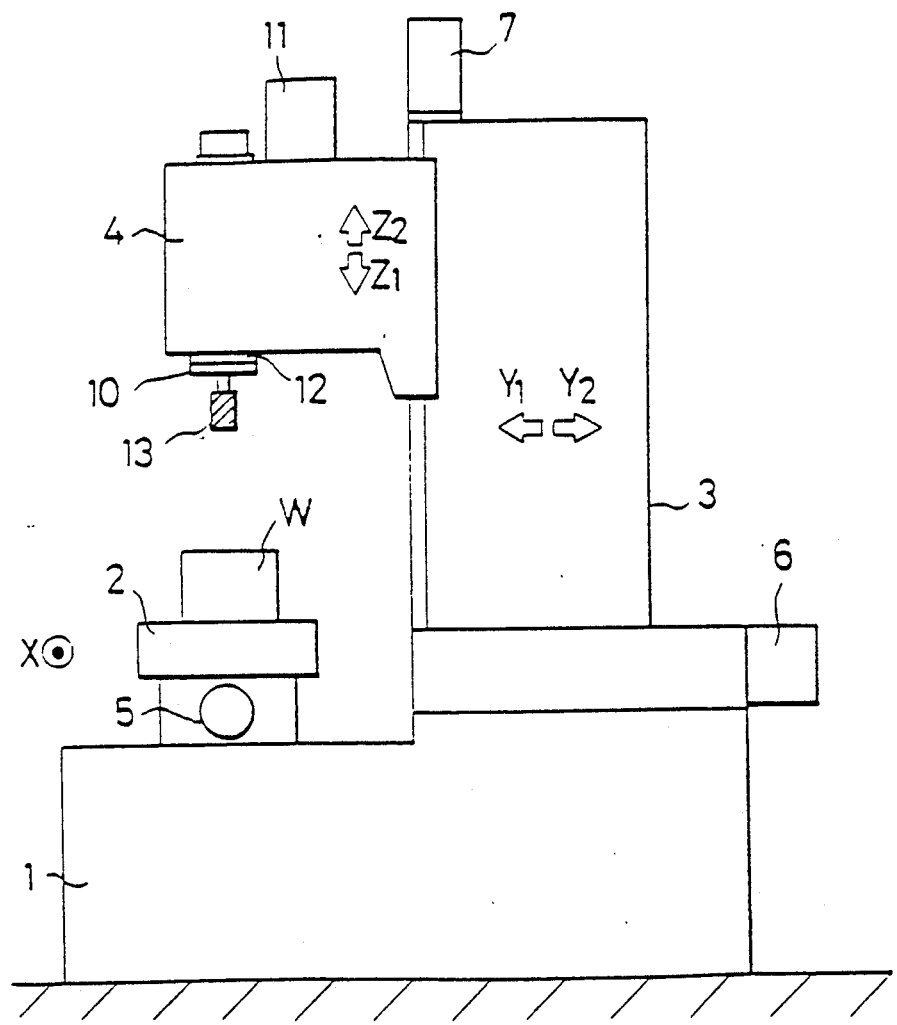
FIG. 1 is a side view showing a machine tool adapted in accordance with the present invention for sensing the thrust load on the machine tool spindle.

FIG. 1 shows a machine tool including a bed 1, table 2, column 3, spindlehead 4 and motors 5, 6, 7 and 11.

A workpiece W is set on the table 2. The table 2 is moved in the X-direction by the motor 5. The column 3 is moved in both the $Y_1$ and $Y_2$ directions by the motor 6. The spindlehead 4 is moved in both the $Z_1$ and $Z_2$ directions by the motor 7.

A toolholder 10 is detachably secured to the spindle 12 of the spindlehead 4. The toolholder 10 is rotated together with tool 13 by the motor 11.

Figure 2:
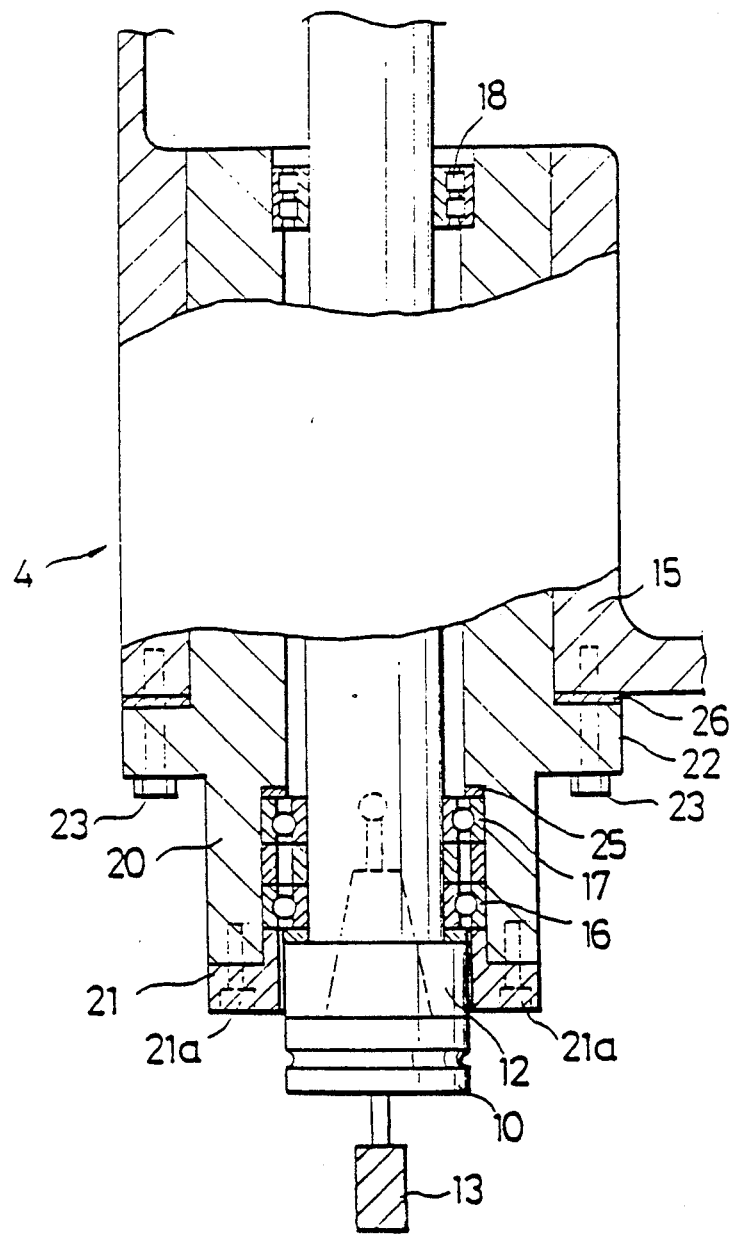
FIG. 2 is a sectional view showing portion of the spindlehead of the machine tool FIG. 1.

Referring to FIG. 2, FIG. 2 shows one embodiment of the present invention, in the form of a spindlehead 4. The spindle 12 is rotatably supported by a cylindrical support portion 20 with thrust bearing 16, 17 and 18. In addition, a cap member 21 is attached to the lower end of the support portion 20 by means of bolts 21a. A flange 22 of the support portion 20 is fixed to a frame 15 by means of bolts 23.

A pressure sensor 25 is positioned between the thrust bearing 17 and the shoulder of a counterbore in support portion 20 which houses bearings 16 and 17. A second pressure sensor 26 is positioned between the flange 22 and the frame 15 in the above-mentioned manner.

Each of pressure sensors 25 and 26 may be, for example, a piezo-electric film pressure sensor. A suitable pressure sensor 26 is shown in FIG. 3 by way of example.

Figure 3:
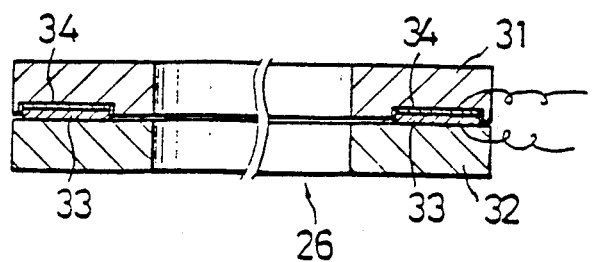
FIG. 3 is a sectional view showing one type of pressure sensor which may be employed in the present invention.
Figure 4:
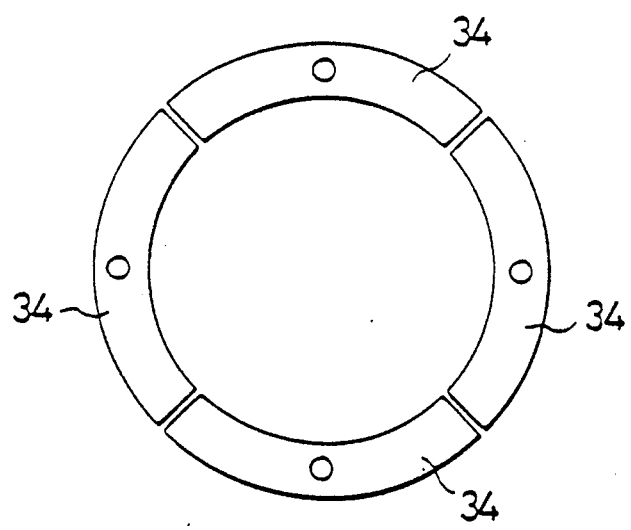
FIG. 4 shows a pressure sensor, in the form of a piezo-electric film, which may be used in the present invention.

With reference to FIGS. 3 and 4, FIGS. 3 and 4 show an annular pressure sensor as including an insulator 33 and a piezo-electric film 34 are arranged between ring supports 31 and 32 of the pressure sensor 26. In particular, the piezo-electric film is divided into four equal segments 34. Thus, the four equal segments sense the direction and magnitude of the load distribution applied to the spindle.

When a workpiece is actually machined by rotating the tool 13 attached to the spindle 12 in FIG. 2, the thrust load applied to the spindle 12 can be directly sensed by the pressure sensors 25 and 26. The sensed thrust load is available for determining tool breakage or tool wear, which determination is itself conventional.

Figure 5:
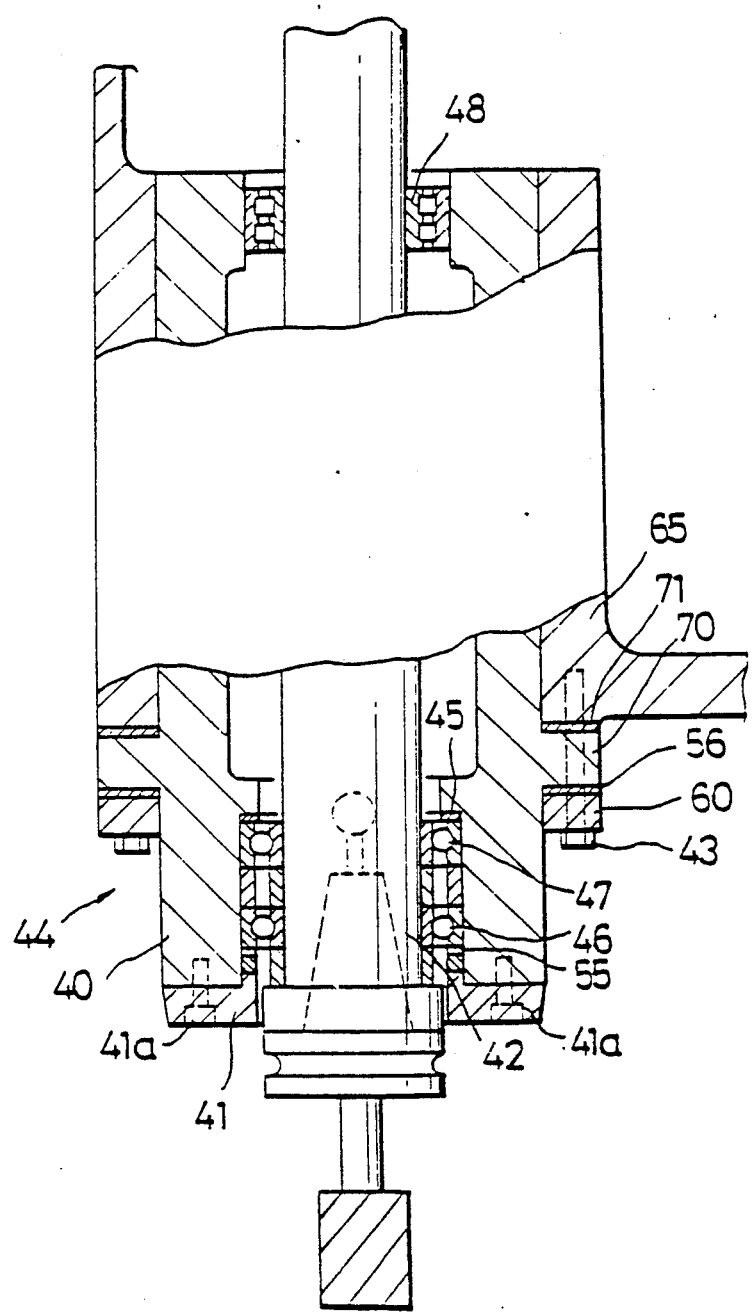
FIG. 5 is a sectional view showing a spindlehead of another machine tool which may be used for the present invention.

FIG. 5 shows another embodiment of the present invention. FIG. 5 shows a spindlehead 44 including a spindle 42 rotatably supported by a cylindrical support portion 40 with thrust bearings 46, 47 and 48. A cap member 41 is attached to the lower end of the support portion 40 by means of bolts 41a. A flange 70 of the support 40 is fixed to a frame 65 by means of a flange ring 60 and bolts 43.

An annular pressure sensor 45 is arranged between the thrust bearing 47 and an interior annular shoulder or seat in the support portion 40. A pressure sensor 55 is arranged between the thrust bearing 46 and the support portion 40. A second annular pressure sensor 71 is arranged between the flange 70 and the frame 65. A pressure sensor 56 is arranged between the flange 70 and the ring 60.

Each of the pressure sensors 45, 55, 56 and 71 is, for example, a piezo-electric film pressure sensor.

Both the paired annular pressure sensors 45 and 55 and the paired annular pressure sensors 56 and 71 sense the preloading applied through the bolts 41a and 43 and, thus, the values for sensed pressures under load can be adjusted to provide accurate data.

Of course, the invention is not restricted to the above-mentioned embodiments. For example, pressure sensors of types other than piezo-electric pressure sensors may be employed in this invention. The present invention offers the advantage that the thrust load alone, applied to the spindle or the tool, is directly sensed. Accordingly, pressure data can be obtained with a high degree of accuracy.

I claim:

1. A machine tool with thrust load sensing, said machine tool comprising:
   a column;
   a spindlehead having a frame and a spindle support said frame having an opening and an annular seat surrounding said opening, said spindle support being slidably mounted within said opening and having a flange, which mates with said annular seat, and a central bore;
   thrust bearings mounted within said central bore;
   a spindle shaft rotatably supported within said central bore by said thrust bearings;
   a toolholder, for holding a tool, mounted on one end of said spindle shaft;
   means for rotating said spindle shaft and toolholder;
   means for reciprocably moving said spindlehead with respect to said column so as to place a thrust load on said spindle support and said toolholder, whereby a rotating tool, held within said toolholder, is forced against a workpiece; and
   a pressure sensor mounted between said annular seat and said flange for measuring said thrust load.

2. The machine tool of claim 1 further comprising securing means for holding said flange against said annular seat with said pressure sensor mounted therebetween.

3. The machine tool of claim 2 wherein said securing means comprises at least one bolt.

4. The machine tool of claim 2 further comprising an annular flange ring, pressed against said flange opposite said first annular seat by said securing means, and a second pressure sensor mounted between said flange ring and said flange.

5. The machine tool of claim 4 wherein said first and second pressure sensors comprise annular, pressure-sensitive elements.

6. The machine tool of claim 5 further comprising an annular flange ring pressed against said flange opposite said annular seat by said securing means, and a third annular pressure sensor mounted between said flange ring and said flange.

7. The machine tool of claim 1 wherein said pressure sensor comprises an annular piezo-electric film.

8. The machine tool of claim 7 wherein said annular pressure sensor is divided into a plurality of segments.

9. The machine tool of claim 1 further comprising a second pressure sensor and a second annular seat formed in said central bore, said second pressure sensor being mounted between one of said thrust bearings and said second annular seat.

10. A machine tool with thrust load sensing, said machine tool comprising:
    a column;
    a spindlehead having a frame and a cylindrical spindle support, said frame having cylindrical opening and a first annular seat surrounding said opening, said spindle support being slidably mounted within said opening and having a flange, which mates with said first annular seat, and a central bore with a second annular seat formed therein;
    thrust bearings mounted within said central bore;
    a spindle shaft rotatably supported within said central bore by said thrust bearings;
    a toolholder, for holding a tool, mounted on one end of said spindle shaft;
    means for rotating said spindle shaft and said toolholder;
    means for reciprocably moving said spindlehead with respect to said column so as to place a thrust load on said spindle support and said toolholder, whereby a rotating tool, held within said toolholder, is forced against a workpiece; and
    a pressure sensor mounted between said second annular seat and one of said thrust bearings for measuring said thrust load.

11. The machine tool of claim 10 wherein said pressure sensor comprises an annular piezo-electric film.

12. The machine tool of claim 11 wherein said annular pressure sensor is divided into a plurality of segments.

13. A method for sensing a thrust load applied to a spindle shaft of a machine tool, the spindle shaft being rotatably supported through bearings by a spindle support which is supported by a frame, said method comprising:
    positioning a first pressure sensor between two adjacent first surfaces normal to the axis of the spindle shaft, one of said first surfaces being on the spindle support;
    applying a thrust load to the spindle shaft;
    generating a first signal from the first pressure sensor, said first signal representing only the thrust load on the spindle shaft; and
    positioning a second pressure sensor between two adjacent second surfaces normal to the axis of the spindle shaft, one of said second surfaces being on the spindle support, and generating a second signal from the second pressure sensor, said second signal representing only the thrust load on the spindle shaft.

14. The method of claim 13 wherein the other of said first surfaces is a surface of one of the bearings and the other of said second surfaces is on the frame.

15. The method of claim 14 wherein all of said surfaces are annular surfaces.

16. The method of claim 13 further comprising positioning a third pressure sensor between two adjacent third surfaces normal to the axis of the spindle shaft, one of said third surfaces being on the spindle support, and generating a third signal from the third pressure sensor, said third signal representing only the thrust load on the spindleshaft.

* * * * *